(12) United States Patent
Jung

(10) Patent No.: US 7,864,422 B2
(45) Date of Patent: Jan. 4, 2011

(54) DISPLAY DEVICE

(75) Inventor: Jin-Hee Jung, Annyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/726,922

(22) Filed: Mar. 18, 2010

(65) Prior Publication Data

US 2010/0172023 A1     Jul. 8, 2010

Related U.S. Application Data

(62) Division of application No. 11/476,069, filed on Jun. 28, 2006, now abandoned.

(30) Foreign Application Priority Data

Jun. 29, 2005   (KR)  ..................... 10-2005-0057084

(51) Int. Cl.
G02B 27/22     (2006.01)
(52) U.S. Cl. ......................... 359/463; 348/59
(58) Field of Classification Search ........................ None
See application file for complete search history.

(56) References Cited

U.S. PATENT DOCUMENTS

| | | | |
|---|---|---|---|
| 5,493,427 A * | 2/1996 | Nomura et al. ................. 349/5 |
| 6,069,650 A | 5/2000 | Battersby | |
| 6,176,582 B1 * | 1/2001 | Grasnick ........................ 353/7 |
| 6,724,459 B2 | 4/2004 | Yoon | |
| 7,058,252 B2 | 6/2006 | Woodgate et al. | |
| 2006/0050016 A1 * | 3/2006 | Tomisawa et al. ............. 345/32 |
| 2006/0158729 A1 * | 7/2006 | Vissenberg et al. ......... 359/462 |
| 2008/0204872 A1 | 8/2008 | Ljzerman et al. | |

FOREIGN PATENT DOCUMENTS

| | | |
|---|---|---|
| JP | 06-046461 | 2/1994 |
| JP | 09-148549 | 6/1997 |
| JP | 2003-029205 | 1/2005 |

OTHER PUBLICATIONS de Zwart et al., "A 20 Switchable Auto-Stereoscopic 2D/3D Display", *Philips Research Laboratories*, pp. 1459-1460, (2004).

* cited by examiner

*Primary Examiner*—Lee Fineman
(74) *Attorney, Agent, or Firm*—McKenna Long & Aldridge

(57) ABSTRACT

A display device comprising: a display cell including at least two color regions, each of the at least color regions including a right-eye pixel and a left-eye pixel corresponding to a right eye and a left eye of a viewer, respectively; and a lenticular cell including at least two lenses corresponding to the at least two color regions, wherein the at least two lenses having different focal lengths.

8 Claims, 5 Drawing Sheets

DISPLAY DEVICE

This is a divisional application of U.S. patent application Ser. No. 11/476,069, filed on Jun. 28, 2006, now abandoned which claims the benefit of Korean Patent Application No. 10-2005-0057084, filed on Jun. 29, 2005, all of which are hereby incorporated by reference for all purposes as if fully set forth herein.

BACKGROUND OF THE INVENTION

1. Field of the Invention

The present invention relates to a display device, and more particularly, to a lenticular type display device.

2. Discussion of the Related Art

Today, a two-dimensional display device is generally used. Recently, because of wideband communication networks, a three-dimensional display device has been researched and developed.

There are various types of three-dimensional image displays with various types, for example, a depth image type, a three-dimensional image type, a stereographic type and the like. The depth image type is used for three-dimensional computer graphics or an I-MAX movie. The three-dimensional image type is used for a holographic image. The depth image type and the three-dimensional image type require large amounts of data and result in a high cost. So, presently, the stereographic type is used widely.

The stereographic type display device displays a three-dimensional image using binocular parallax. When the right and left eyes look at respective two two-dimensional images, the two two-dimensional images are transferred to the brain and then the brain mixes the two two-dimensional images. Thus, three-dimensional images having depth and reality are perceived. The stereographic type display device includes a display device that uses specific glasses and a display device without glasses. The stereographic type display device without glasses is preferred to the stereographic type display device that uses the specific glasses because the stereographic type display device without glasses does not need the separate glasses. The stereoscopic display devices without glasses are divided into a parallax barrier type, a lenticular type, and the like. Of these types, the lenticular type has been mainly used.

FIG. 1 is a cross-sectional view illustrating a lenticular type display device according to the related art.

As shown in FIG. 1, the lenticular type display device includes a display cell 10 and a lenticular cell 20. The display cell 10 includes left-eye and right-eye red, green and blue pixels $R_L$, $R_R$, $G_L$, $G_R$, $B_L$ and $B_R$. The left-eye red, green and blue pixels $R_L$, $G_L$ and $B_L$ are for a left eye of a viewer 2, and the right-eye red, green and blue pixels $R_R$, $G_R$ and $B_R$ are for a right eye of the viewer 2. The lenticular cell 20 includes a plurality of lens 22 arranged regularly. The lens 22 has a semi-cylindrical shape that extends along a direction perpendicular to a plane of FIG. 1. Two two-dimensional images for the left and right eyes are refracted and transferred to the left and right eyes, respectively, by the lens 22. Therefore, the viewer 2 perceives three-dimensional images due to the binocular parallax.

In FIG. 1, the lenticular type display device having a single view point is shown that the viewer 2 at one direction views the three-dimensional image.

FIG. 2 is a cross-sectional view illustrating a lenticular type display device having a multiple view point according to the related art.

As shown in FIG. 2, three viewers 4, 6 and 8 at different view points view a three-dimensional image through the lenticular type display device. To do this, a plurality of red, green and blue pixels R1, R2, R3, R4, G1, G2, G3, G4, B1, B2, B3 and B4 are arranged regularly. A right eye of the first viewer 4 corresponds to the first red, green and blue pixels R1, G1 and B1, and a left eye of the first viewer 4 corresponds to the second red, green and blue R2, G2 and B2. A right eye of the second viewer 6 corresponds to the third red, green and blue R3, G3 and B3, and a left eye of the second viewer 6 corresponds to the fourth red, green and blue R4, G4 and B4. A right eye of the third viewer 8 corresponds to the first red pixel R1, the first green pixel G1 and the first blue pixel B1, and a left eye of the third viewer 8 corresponds to the second red, green and blue pixels R2, G2 and B2. A lenticular cell refracts the two-dimensional images through the lens 22.

The related art lenticular type display devices have the following problems. The related art lenticular type display device is used only for a three-dimensional display device because the lens has permanent optical properties. If a viewer continues viewing a three-dimensional image for a long time using the lenticular type display device, the viewer feels tired. Accordingly, it is necessary that the three-dimensional image is changed into a two-dimensional image, however, it is difficult to change the image display modes in the related art lenticular type display device.

In the related art lenticular type display device, lenses having the same shape are used, irrespective of a refraction difference of red, green and blue colors. Accordingly, a chromatic aberration occurs.

FIG. 3 is a schematic view illustrating a chromatic aberration occurring in the related art lenticular type display device. In FIG. 3, for brevity of explanation, only red and violet light are shown.

As shown in FIG. 3, because red and violet light have different wavelengths but pass through the same lens, the red and violet light are focused at different points. This phenomenon is caused due to a chromatic difference of magnification. Therefore, display quality is reduced.

SUMMARY OF THE INVENTION

Accordingly, the present invention is directed to a display device that substantially obviates one or more of problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, according to an aspect of the present invention, there is provided a display device including: a display cell including at least two color regions, each of the at least color regions including a right-eye pixel and a left-eye pixel corresponding to a right eye and a left eye of a viewer, respectively; and a lenticular cell including at least two lenses corresponding to the at least two color regions, respectively, the at least two lenses having different focal lengths.

In another aspect of the present invention, there is provided a display device including: a display cell including at least two color regions, each of the at least two color regions including a right-eye pixel and a left-eye pixel corresponding to a right eye and a left eye of a viewer; and a lenticular cell including at least two lenticular-shaped spaces filled with liquid crystal material corresponding to the at least two color regions, respectively, and having first and second conductive layers generating an electric field applied to the liquid crystal material.

In another aspect of the present invention, there is provided a display device including: a display cell including at least two color regions, each of the at least color regions including a right-eye pixel and a left-eye pixel corresponding to a right eye and a left eye of a viewer, respectively; and a lenticular cell including at least two lenticular-shaped portions corresponding to the at least two color regions, wherein the lenticular shaped portions function as a lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 4:
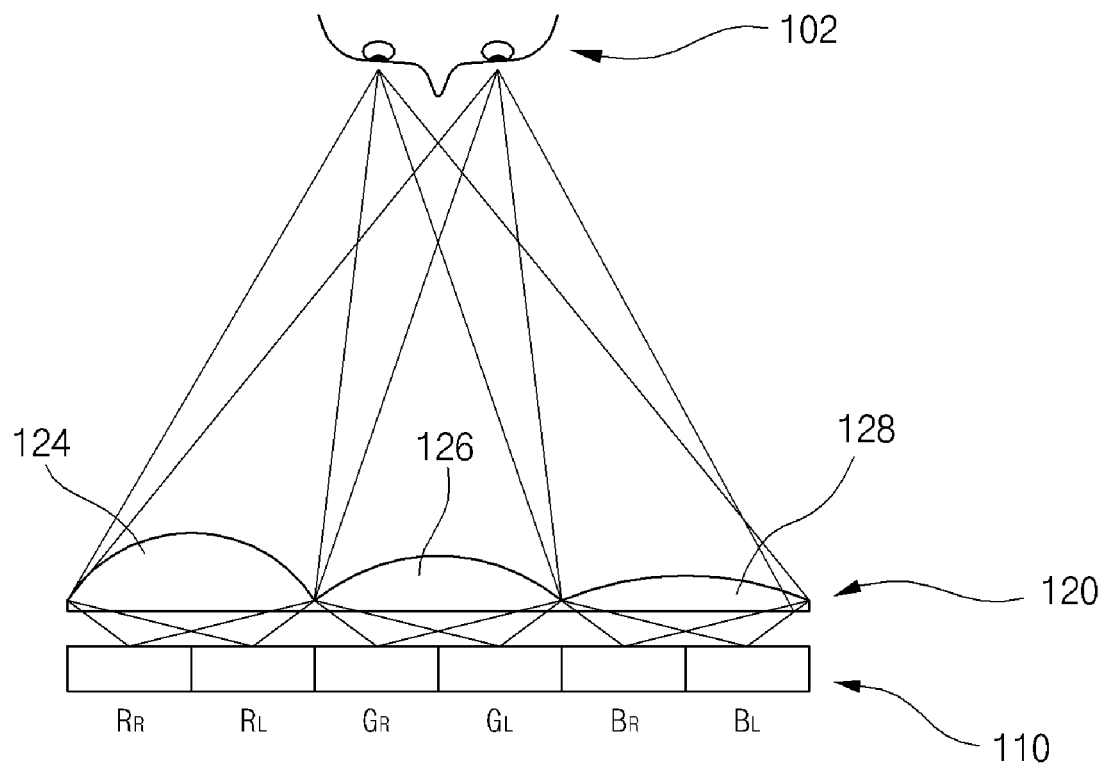
FIG. 4 is a cross-sectional view illustrating a lenticular type display device according to an exemplary embodiment of the present invention.

FIG. 4 is a cross-sectional view illustrating a lenticular type display device according to an exemplary embodiment of the present invention.

As shown in FIG. 4, the lenticular type display device includes a display cell 110 and a lenticular cell 120.

The display cell 110 includes a plurality of pixels in a matrix. The plurality of pixels include a pixel producing a two-dimensional image for a right eye and a pixel making a two-dimensional image for a left eye. For example, the plurality of pixels include left-eye and right-eye red, green and blue pixels $R_L$, $R_R$, $G_L$, $G_R$, $B_L$ and $B_R$. The left-eye red, green and blue pixels $R_L$, $G_L$ and $B_L$ are for a left eye of a viewer 102, and the right-eye red, green and blue pixels $R_R$, $G_R$ and $B_R$ are for a right eye of the viewer 102. The right-eye and left-eye pixels having the same color adjoin each other and define a color region.

The lenticular cell 120 includes a plurality of lens 124, 126 and 128. The lens 124, 126 and 128 may have a semi-cylindrical shape extending along a direction perpendicular to a plane of FIG. 4. The plurality of lens 124, 126 and 128 includes first, second and third lens 124, 126 and 128 having different focal lengths (i.e., refractive index).

The first, second and third lens 124, 126 and 128 are arranged periodically such that the first lens 124 having a first focal length corresponds to the right and left red pixels $R_R$ and $R_L$, the second lens 126 having a second focal length corresponds to the right and left green pixels $G_R$ and $G_L$, and the third lens 128 having a third focal length corresponds to the right and left red pixels $B_R$ and $B_L$.

Because red, green and blue lights have different wavelengths, the first, second and third focal lengths are different such that red, green and blue lights are focused at the same position. The red light has a wavelength longer than the green light, and the green light has a wavelength longer than the blue light. The first focal length is less than the second focal length, and the second focal length is less than the third focal length. Accordingly, the red, green and blue lights emitted from each of the right-eye pixels and the left-eye pixels are focused at the same position i.e., the right eye and the left eye of the viewer 102. Therefore, a chromatic aberration can be removed.

To make the first to third focal lengths different i.e., first to third refractive index different, the first to third lens 124, 126 and 128 have a different shape such as a radius of curvature and a different thickness, a different material, or a different shape and a different material.

For example, the first lens 124 may have a radius of curvature less than the second lens 126, and the second lens 126 may have a radius of curvature less than the third lens 128. The first lens 124 may have a material of a refractive index higher than the second lens 126, and the second lens 126 may have a material of a refractive index higher than the third lens 128.

As explained above, the lens corresponding to the different color pixels have the different focal lengths such that the different color lights are focused at the same position. To do this, the shape, the material or both the shape and the material may be varied. Therefore, the chromatic aberration may be removed.

In FIG. 4, the lenticular type display device having a single view point is shown that the viewer 102 at one direction views the three-dimensional image.

Figure 1:
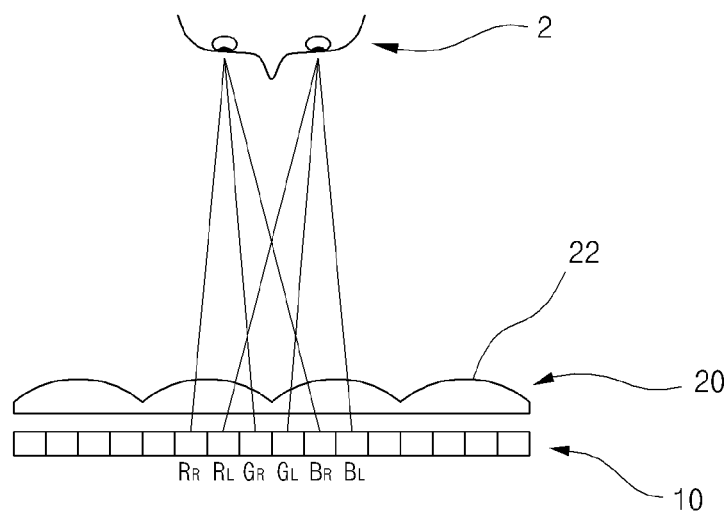
FIG. 1 is a cross-sectional view illustrating a lenticular type display device according to the related art.
Figure 2:
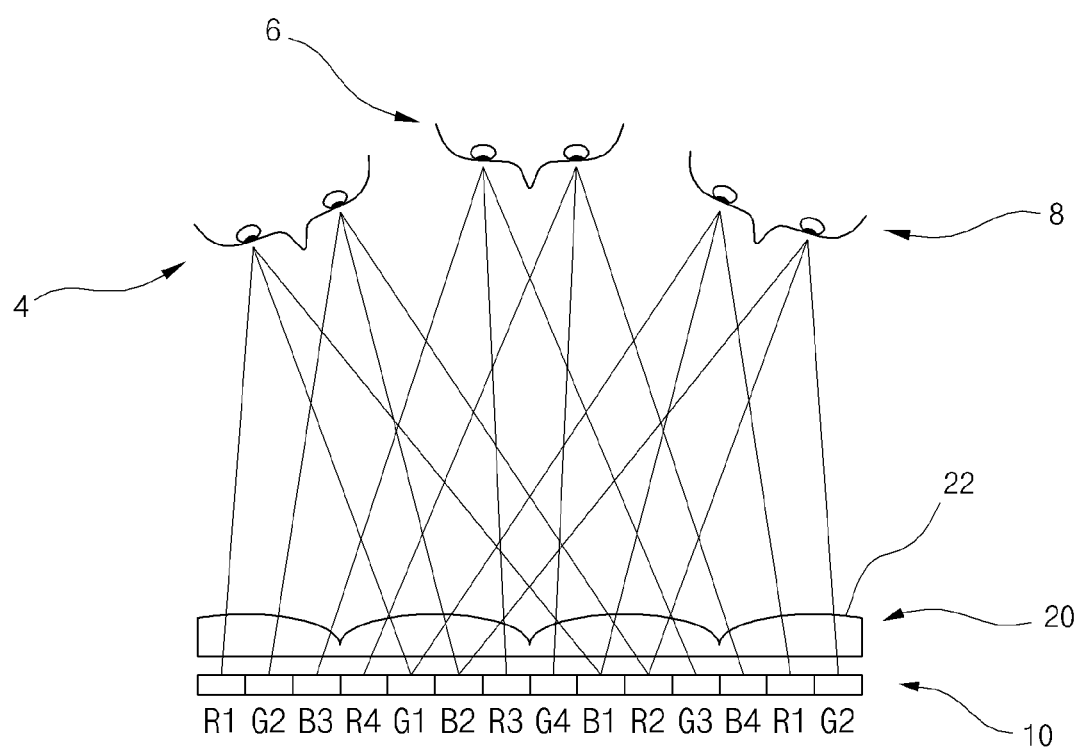
FIG. 2 is a cross-sectional view illustrating a lenticular type display device having multiple view points according to the related art.
Figure 3:
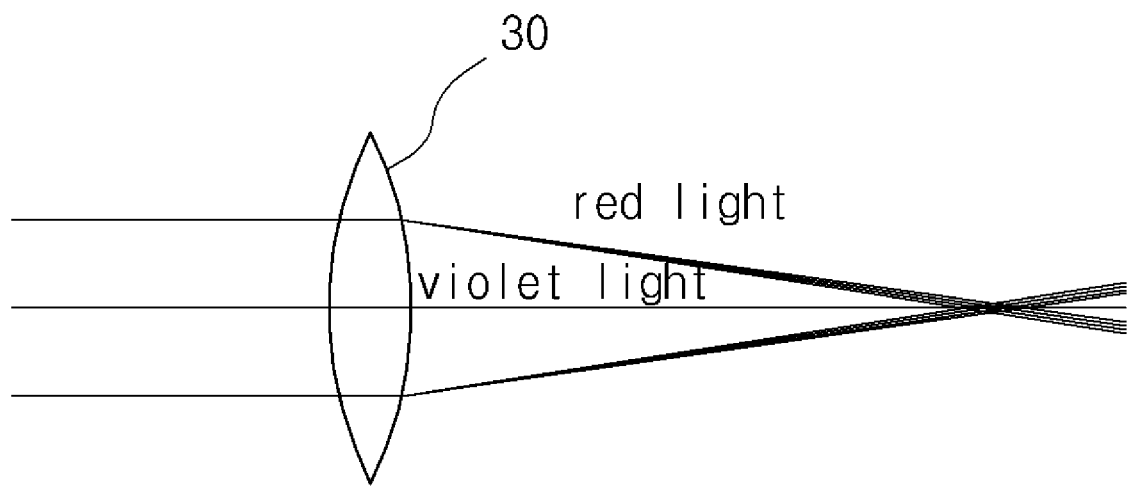
FIG. 3 is a schematic view illustrating a chromatic aberration occurring in the related art lenticular type display device.
Figure 5:
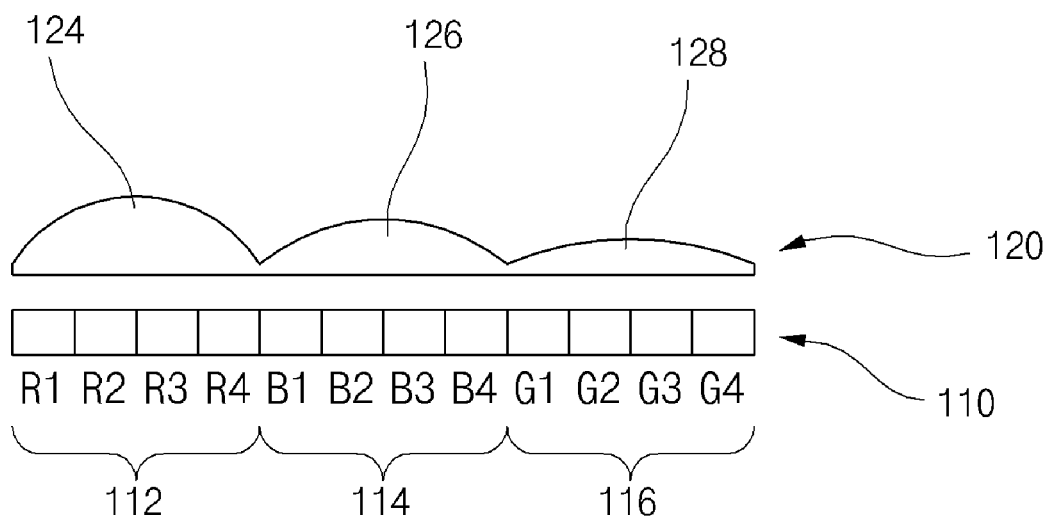
FIG. 5 is a cross-sectional view illustrating a lenticular type display device having multiple view points according to another exemplary embodiment.

FIG. 5 is a cross-sectional view illustrating a lenticular type display device having multiple view points according to another exemplary embodiment. In FIG. 5, the lenticular type display device having triple view points is shown, similar to that of FIG. 3. In FIG. 5, the lenticular type display device is similar to that of FIG. 4, except for having multiple view points. Explanations of parts similar to parts of FIGS. 3 and 4 are omitted.

The display cell 110 includes four pixels emitting the same color, for example, first to fourth red pixels R1 to R4, first to fourth green pixels G1 to G4, and first to fourth blue pixels B1 to B4. The four red, green and blue pixels define red, green and blue regions 112, 114 and 116, respectively. The four pixels having the same color are arranged in each of the red, green and blue regions 112, 114 ad 116. For example, a right eye of a first viewer corresponds to the first red, green and blue pixels R1, G1 and B1, and a left eye of the first viewer corresponds to the second red, green and blue R2, G2 and B2.

A right eye of a second viewer corresponds to the third red, green and blue R3, G3 and B3, and a left eye of the second viewer corresponds to the fourth red, green and blue R4, G4 and B4. A right eye of a third viewer corresponds to the first red pixel R1, the first green pixel G1 and the first blue pixel B1, and a left eye of the third viewer corresponds to the second red, green and blue pixels R2, G2 and B2.

A lenticular cell 120 having first, second and third lens 124, 126 and 128 corresponding to the red region 112 (pixels), the green region 114 (pixels) and the blue region 116 (pixels), respectively, as similar to that of FIG. 4. The first to third lens 124, 126 and 128 may have a different shape such as a radius of curvature and a different thickness, a different material, or a different shape and a different material, similar to that of FIG. 4.

As explained above, the lens corresponding to the different color pixels have the different focal lengths such that the different color lights are focused at the same position. The multiple pixels having the same color are disposed below the corresponding lens. Therefore, the chromatic aberration may be removed and the multiple view points can be achieved simply.

In the embodiments of FIGS. 4 and 5, the display cell may include various cell types, for example, a liquid crystal cell, a plasma display panel cell, a light emitting diode cell, a cathode ray tube cell and the like. The color regions may be arranged in a matrix. The lens having different focal lengths may be adequately arranged in a matrix like the pixels and the color regions. The display cell may have other color type pixels making a white color, for example, cyan, magenta and yellow pixels.

The lenticular type display devices of FIGS. 4 and 5 are display devices for a three-dimensional mode.

Figure 6A:
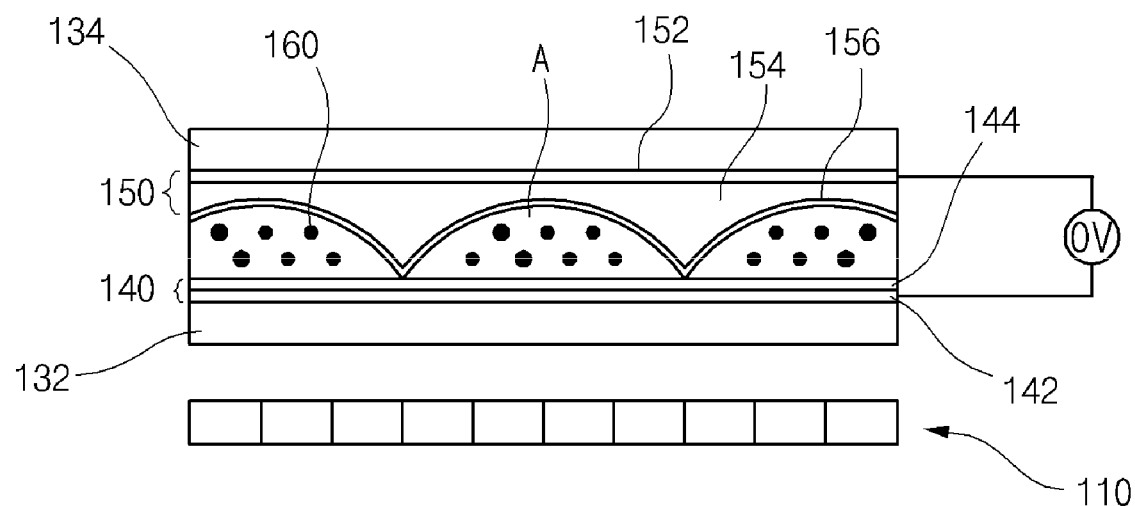
FIGS. 6A and 6B are cross-sectional views illustrating a lenticular type display device, which is convertible between a two-dimensional mode and a three-dimensional mode, according to another exemplary embodiment of the present invention.
Figure 6B:
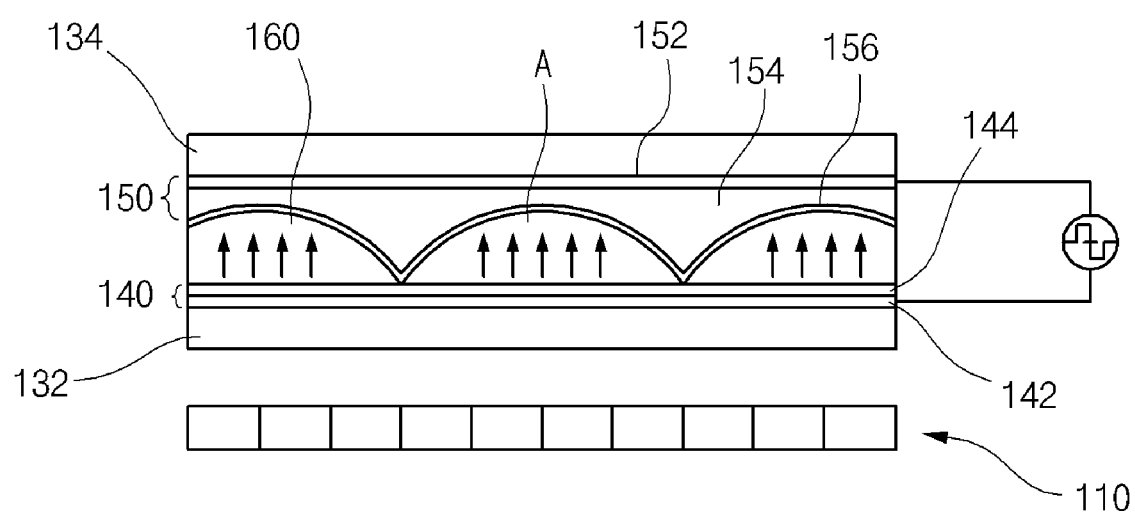

FIGS. 6A and 6B are cross-sectional views illustrating a lenticular type display device, which is convertible between a two-dimensional mode and a three-dimensional mode, according to another exemplary embodiment of the present invention. The lenticular type display device of FIGS. 6A and 6B is similar to that of FIGS. 4 and 5, except for the lenticular cell.

As shown in FIGS. 6A and 6B, the lenticular type display device includes a display cell 110 and a lenticular cell 120. The display cell 110 includes a plurality of pixels making at least two two-dimensional images.

The lenticular cell 120 includes first and second substrates 132 and 134 and a liquid crystal layer 160 filled in a lenticular-shaped space A between the first and second substrates 132 and 134. The lenticular cell 120 is transparent so that light emitted from the display cell 110 passes through the lenticular cell 120. Because the liquid crystal layer 160 has an optical anisotropy and a polarization property, the liquid crystal layer 160 having an ordinary refractive index and an extra-ordinary refractive index is used in the lenticular type display device so that both a two-dimensional image and a three-dimensional image are controllably displayed.

In more detail, on the first substrate 132, a first transparent conductive layer 140 is disposed. The first transparent conductive layer 140 includes a first electrode 142 and a first alignment layer 144 disposed sequentially. On the second substrate 134, a second transparent conductive layer 150 is disposed. The second transparent conductive layer 150 includes a second electrode 152, a replica layer 154 and a second alignment layer 156 disposed sequentially.

A liquid crystal layer 160 fills a lenticular-shaped space A between the first and second alignment layers 144 and 156. The above components of the lenticular cell 120 are transparent. The first and second electrodes 142 and 152 may include a transparent conductive material such as indium-tin-oxide (ITO), indium-zinc-oxide (IZO) and indium-tin-zinc-oxide (ITZO). The first and second alignment layers 144 and 156 are rubbed to initially arrange the liquid crystal molecules.

The replica layer 154 has a plurality of curved-shaped portions. The curved-shaped portion is concave. The curved-shaped portion and the first alignment layer 144 define the lenticular-shaped space A. Accordingly, the liquid crystal layer 160 filled in the lenticular-shaped space A has a lenticular shape. The first alignment layer 144 may be flat or curved, and the liquid crystal layer 160 may include a nematic liquid crystal material. Each curved-shaped portion may correspond to at least two pixels having the same color similar to FIGS. 4 and 5.

A refraction of the liquid crystal layer 160 is varied in accordance with an arrangement of liquid crystal molecules. The arrangement of liquid crystal molecules is varied in accordance with an electric field generated by a voltage difference of the first and second electrodes 142 and 152. Accordingly, the liquid crystal layer 160 functions as a non-refractor (i.e., non-lens) when the lenticular type display device is driven in a two-dimensional mode, and the liquid crystal layer 160 functions as a lens when the lenticular type display device is driven in a three-dimensional mode. For example, the liquid crystal layer 160 functions as a non-refractor for a two-dimensional mode when the extra-ordinary refractive index of the liquid crystal molecule matches a refractive index of the first and second transparent conductive layers 140 and 150. The liquid crystal layer 160 functions as a lens for a three-dimensional mode when the ordinary refractive index of the liquid crystal molecule matches a refractive index of the first and second transparent conductive layers 140 and 150.

Referring to FIG. 6A, when a voltage is not applied to the first and second electrodes 142 and 152, an electric field is not applied to the liquid crystal molecules. Accordingly, the liquid crystal layer 160 functions as a non-refractor. Therefore, the lenticular type display device is driven in a two-dimensional mode.

Referring to FIG. 6B, when a voltage is applied to the first and second electrodes 142 and 152, an electric field is applied to the liquid crystal molecules. Accordingly, the liquid crystal layer 160 functions as a lens. Therefore, the lenticular type display device is driven in a three-dimensional mode.

In FIGS. 6A and 6B, the lenticular-shaped spaces A having the same shape are shown. Alternatively, the lenticular-shaped spaces A may have a different shape such as radius of curvature or thickness, as similar to FIGS. 4 and 5. When the lenticular-shaped spaces A have the same shape and the same liquid crystal molecules, at least one of the first and second electrodes 142 and 152 may be divided to correspond to each lenticular-shaped space A. Such the divided portions may have different voltages applied such that the lenticular-shaped spaces A corresponding to the divided portions have a different refraction.

Figure 7A:
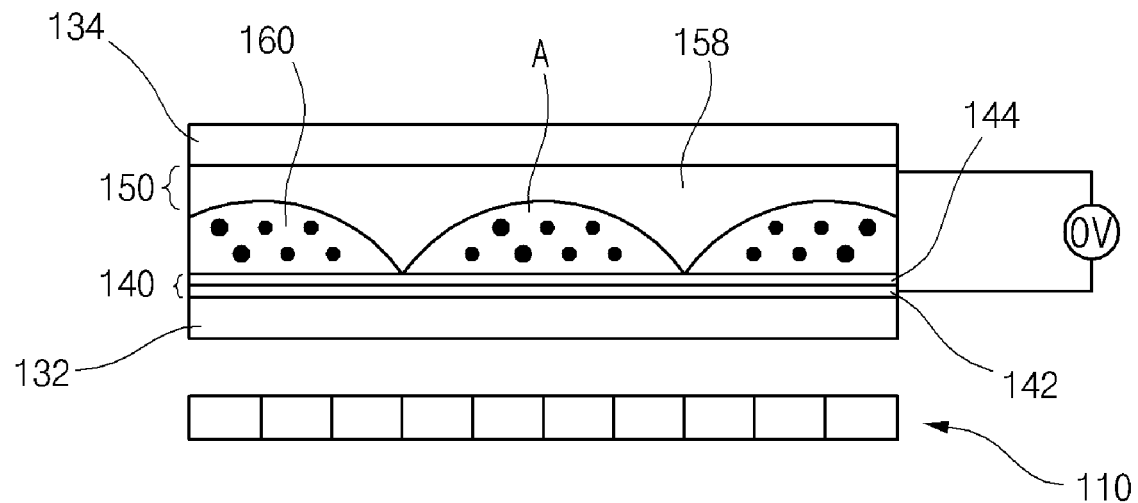
FIGS. 7A and 7B are cross-sectional views illustrating a lenticular type display device, which is convertible between a two-dimensional mode and a three-dimensional mode, according to another exemplary embodiment of the present invention.
Figure 7B:
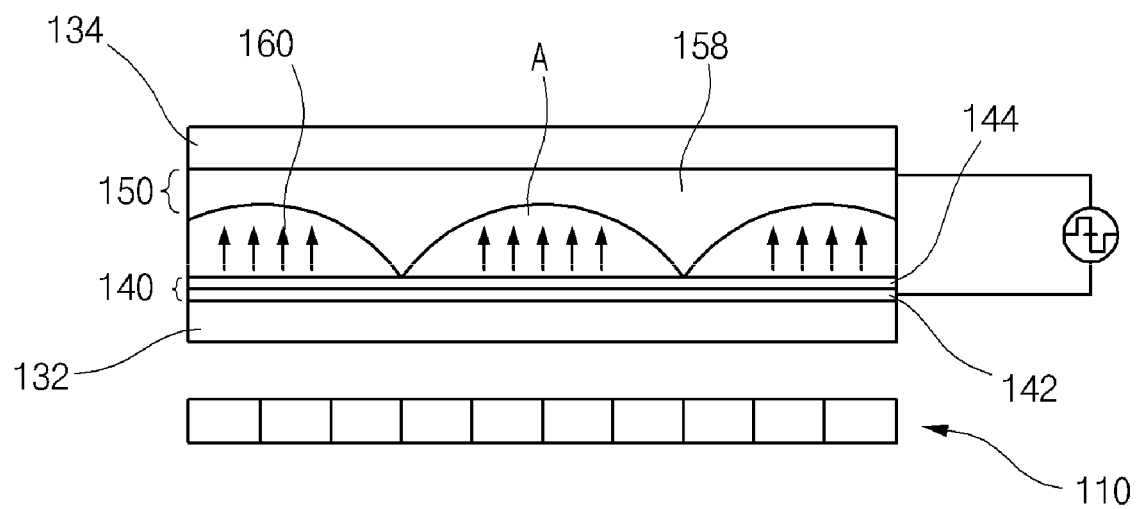

FIGS. 7A and 7B are cross-sectional views illustrating a lenticular type display device, which is convertible between a two-dimensional mode and a three-dimensional mode, according to another exemplary embodiment of the present invention. The lenticular type display device of FIGS. 7A and 7B is similar to that of FIGS. 6A and 6B, except for a lenticular cell.

As shown in FIGS. 7A and 7B, a second transparent layer 150 of a lenticular cell 120 includes a conductive high-molecular layer 158 on a second substrate 134, instead of the second electrode, the replica layer and the second alignment layer of FIGS. 6A and 6B. The conductive high-molecular layer 158 functions as the second electrode, the replica layer and the second alignment layer of FIGS. 6A and 6B. The conductive high-molecular layer 158 is applied with a voltage and rubbed, and has a plurality of portions having a curved shape. A first transparent layer 140 includes an electrode 142 and an alignment layer 144 disposed sequentially on a first substrate 132. A display cell 110 includes a plurality of pixels making at least two two-dimensional images.

As the conductive high-molecular layer 158 replaces the second electrode, the replica layer and the second alignment layer of FIGS. 6A and 6B, fabrication processes may be simplified. A liquid crystal layer 160 is closer to where the electric field is generated in comparison with FIGS. 6A and 6B, so the lenticular type display device can be driven with a lower power.

Referring to FIG. 7A, when a voltage is not applied to the electrode 142 and the conductive high-molecular layer 158, an electric field is not applied to the liquid crystal molecules. Accordingly, the liquid crystal layer 160 functions as a non-refractor. Therefore, the lenticular type display device is driven in a two-dimensional mode.

Referring to FIG. 7B, when a voltage is applied to the electrode 142 and the conductive high-molecular layer 158, an electric field is applied to the liquid crystal molecules. Accordingly, the liquid crystal layer 160 functions as a lens. Therefore, the lenticular type display device is driven in a three-dimensional mode.

In FIGS. 7A and 7B, the first transparent conductive layer may include a conductive high-molecular layer, instead of the electrode 142 and the alignment layer 144, like the second transparent conductive layer.

As explained in the above exemplary embodiments of the present invention, as the lenses including different focal lengths are used, a chromatic aberration can be removed. As the liquid crystal material is shaped like the lens, the lenticular-shaped liquid crystal material functions as the non-refractor (non-lens) for a two-dimensional mode and the lens for a three-dimensional mode. By this optical function of the liquid crystal material, the lenticular type display device can be driven selectively with a two-dimensional mode and a three-dimensional mode.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
    a display cell including at least two color regions, each of the at least color regions including a right-eye pixel and a left-eye pixel corresponding to a right eye and a left eye of a viewer, respectively; and
    a lenticular cell including at least two lenses corresponding to the at least two color regions, the at least two lenses having different focal lengths.

2. The device according to claim 1, wherein a light from one of the at least two color regions is focused substantially at the same point as a light from other of the at least two color regions.

3. The device according to claim 1, wherein the at least two color regions include red, green and blue color regions, or cyan, magenta and yellow color regions.

4. The device according to claim 1, wherein each of the at least two color regions further includes another right-eye pixel and another left-eye pixel corresponding to a right eye and a left eye of another viewer, respectively.

5. The device according to claim 1, wherein the at least two color regions are arranged in a matrix in the display cell.

6. The device according to claim 1, wherein the at least two lenses are different in at least one of a shape and a material to have the different focal lengths.

7. The device according to claim 6, wherein the shape includes a radius of curvature, wherein the radius of curvature is different for the two lenses.

8. A display device comprising:
    a display cell including at least two color regions, each of the at least color regions including a right-eye pixel and a left-eye pixel corresponding to a right eye and a left eye of a viewer, respectively;
    a lenticular cell including at least two lenticular-shaped portions corresponding to the at least two color regions, wherein the lenticular shaped portion functioning as a lens; and
    wherein the at least two lenticular-shaped portions have different focal lengths such that a light from one of the at least two color regions is focused substantially at the same point as a light from other of the at least two color regions.

* * * * *